(12) United States Patent
McGehee

(10) Patent No.: US 7,802,435 B2
(45) Date of Patent: Sep. 28, 2010

(54) COGENERATION PROCESS FOR A REGENERATOR IN AN FCC SYSTEM

(75) Inventor: James F. McGehee, Mount Prospect, IL (US)

(73) Assignees: UOP LLC, Des Plaines, IL (US); BP Corporation North America Inc., Warrenville, IL (US)

( * ) Notice: Subject to any disclaimer, the term of this patent is extended or adjusted under 35 U.S.C. 154(b) by 950 days.

(21) Appl. No.: 11/643,733

(22) Filed: Dec. 21, 2006

(65) Prior Publication Data
US 2008/0148735 A1    Jun. 26, 2008

(51) Int. Cl.
F02C 6/18    (2006.01)
(52) U.S. Cl. .................. 60/780; 60/39.182; 60/39.511; 60/39.464
(58) Field of Classification Search ............. 60/39.182, 60/39.511, 777, 723, 39.822
See application file for complete search history.

(56) References Cited

U.S. PATENT DOCUMENTS

| | | | | |
|---|---|---|---|---|
| 3,882,671 A * | 5/1975 | Nebgen | .................. | 60/781 |
| 4,338,788 A * | 7/1982 | Fink | ..................... | 60/648 |
| 4,392,345 A * | 7/1983 | Geary, Jr. | ............... | 60/779 |
| 4,904,372 A * | 2/1990 | Goelzer | ............... | 208/113 |
| 5,098,554 A * | 3/1992 | Krishna et al. | ........... | 208/113 |
| 5,451,313 A | 9/1995 | Wegerer et al. | | |
| 5,597,537 A | 1/1997 | Wegerer et al. | | |
| 5,800,697 A | 9/1998 | Lengemann | | |
| 6,149,859 A * | 11/2000 | Jahnke et al. | ............... | 266/154 |
| 6,616,899 B1 | 9/2003 | Upson | | |
| 6,866,771 B2 | 3/2005 | Lomas et al. | | |
| 7,622,033 B1 * | 11/2009 | McGehee | .................. | 208/50 |
| 2006/0266048 A1 * | 11/2006 | Bell et al. | ............... | 60/783 |
| 2007/0209367 A1 * | 9/2007 | Bell et al. | ............... | 60/775 |

OTHER PUBLICATIONS

J. Terrible, et al.; "Consider using hydrogen plants to cogenerate power needs"; Hydrocarbon Processing (International edition); vol. 78/No. 12; pp. 43-53; Dec. 1999.
D.W. Townsend, et al.; "Heat and Power Networks in Process Design—Criteria for Placement of Heat Engines and Heat Pumps in Process Networks"; AIChe Journal (vol. 29, No. 5); pp. 742-748; Sep. 1983.
D.L. Bonk, et al.; "An Evaluation of Gas Turbines for APFBC Power Plants"; Presented to the Powergen 2000 Conference.
D.L. Bonk, et al.; "First-Generation Circulating Pressurized Fluidized Bed (CPFB) Combustor Power System with Industrial Components"; U.S. Department of Energy (date unknown).

* cited by examiner

Primary Examiner—William H Rodriguez
(74) Attorney, Agent, or Firm—Brinks Hofer Gilson & Lione

(57) ABSTRACT

A cogeneration process is provided for a regenerator in a fluidized catalytic cracking system having a reactor and a regenerator. The process includes introducing flue gas from the regenerator into a heating unit to produce heated flue gas at a temperature of at least about 900° C. The heated flue gas is introduced into an expander. Steam is heated with the heated flue gas to produce heated steam. The heated steam is introduced into a turbine to extract energy from the steam.

19 Claims, 3 Drawing Sheets

PRIOR ART PROCESS

US 7,802,435 B2

COGENERATION PROCESS FOR A REGENERATOR IN AN FCC SYSTEM

This application is the result of a joint research agreement between UOP, LLC and BP America, Inc.

BACKGROUND

The present invention relates to a cogeneration process for a regenerator in a fluid catalytic cracking system.

The fluidized catalytic cracking of hydrocarbons is the mainstay process for the production of gasoline and light hydrocarbon products from heavy hydrocarbon charge stocks such as vacuum gas oils or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium.

The FCC process is carried out by contacting the starting material—generally vacuum gas oil, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. One way of reducing overall $CO_2$ emissions is by improving the energy efficiency of the process. Thus, there is a need to provide a way to improve the overall energy efficiency of a fluid catalytic cracking unit.

BRIEF SUMMARY

Embodiments of the present invention generally provide systems and methods of improving the overall energy efficiency of a fluid catalytic cracking unit.

In one aspect, a cogeneration process is provided for a regenerator in a fluidized catalytic cracking system having a reactor and a regenerator. The process includes introducing flue gas from the regenerator into a heating unit to produce heated flue gas at a temperature of at least about 900° C. The heated flue gas is introduced into an expander. Steam is heated with the heated flue gas to produce heated steam at a pressure of at least about 30 bar. The heated steam is introduced into a turbine to extract energy from the steam.

In another aspect, a cogeneration system for a regenerator in a fluidized catalytic cracking system having a reactor and a regenerator includes a heating unit in fluid communication with flue gas from the regenerator and configured to heat the flue gas to a temperature of at least about 900° C. An expander is in fluid communication with the heating unit for producing electricity from the heated flue gas stream. The system includes a steam source and a heat exchanger in fluid communication with the heating unit and the steam source for heating the steam source with the heated flue gas stream. The system also includes a steam turbine in fluid communication with the heated steam from the heat exchanger. The steam turbine is configured to generate electricity.

The foregoing and other features and advantages of the present invention will become apparent from the following detailed description of the presently preferred embodiments, when read in conjunction with the accompanying examples.

DETAILED DESCRIPTION OF THE PREFERRED EMBODIMENTS

Figure 1:
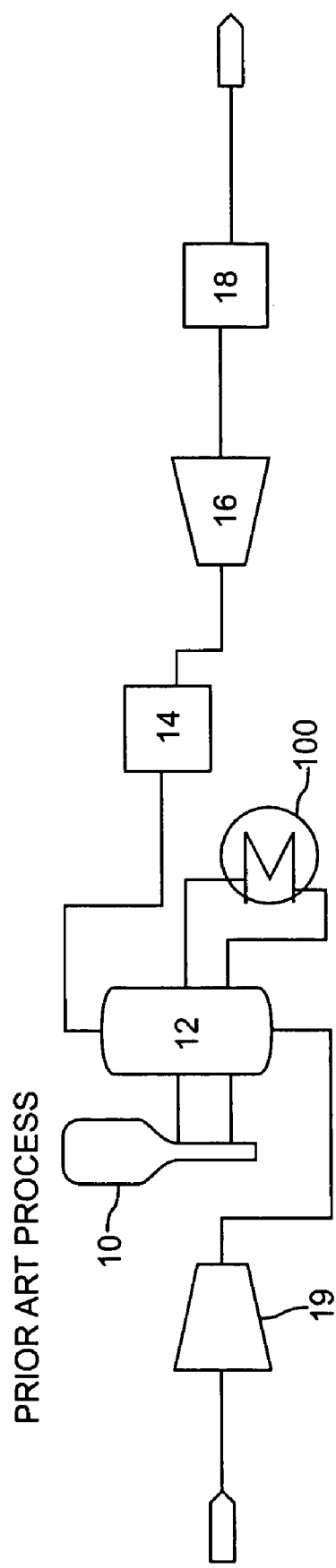
FIG. 1 is a schematic drawing shows a prior art fluidized catalytic cracking process.

The invention is described with reference to the drawings in which like elements are referred to by like numerals. The relationship and functioning of the various elements of this invention are better understood by the following description. Each aspect so defined may be combined with any other aspect or aspects unless clearly indicated to the contrary. The embodiments as described below are by way of example only, and the invention is not limited to the embodiments illustrated in the drawings.

FIG. 1 shows a conventional prior art fluidized catalytic cracking process. The FCC system includes a reactor 10 and a regenerator 12. Air is introduced into the reactor via blower 19. The reactor 10 cracks a hydrocarbon feed into simpler molecules through contact with a catalyst. The regenerator 12 oxidizes coke from the catalyst. The regenerator 12 optionally includes a catalyst cooler 100, which controls the temperature of the catalyst in the regenerator by cooling it with a steam loop. The flue gas exits the regenerator 12 and is optionally treated at a third-stage separator 14, which removes fine particles from the flue gas. The flue gas is then introduced into an expander 16 to recover some of the energy of the flue gas as electricity. Further heat may be recovered from the flue gas via waste heat steam generator 18.

Figure 2:
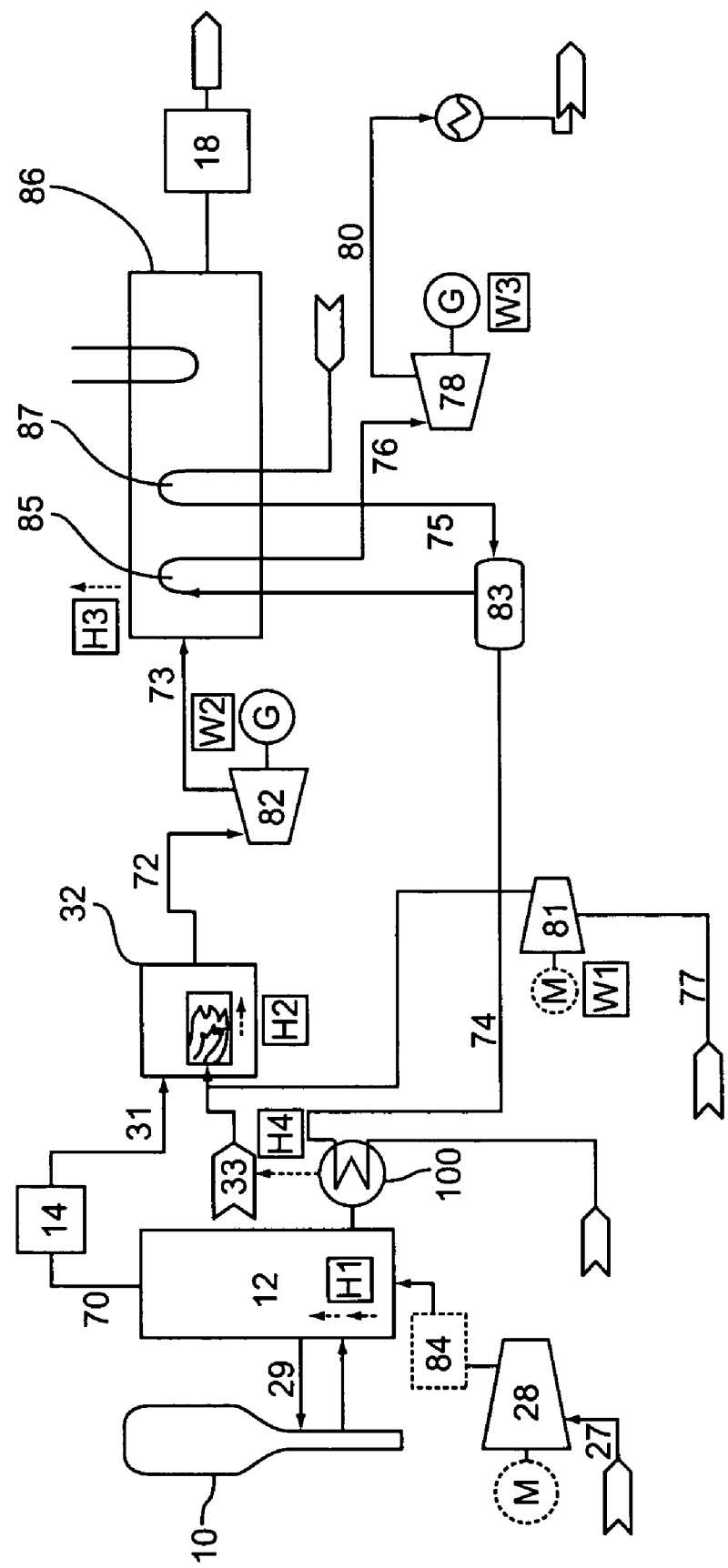
FIG. 2 shows an embodiment of cogeneration process for a regenerator in a fluidized catalytic cracking system.

The present invention uses a cogeneration process to heat the flue gas from the regenerator 12 to produce electricity at high efficiency. An embodiment of the cogeneration process for a regenerator 12 is shown in FIG. 2. In place of blower 19, the process optionally includes a gas turbine blower 28 fed by filtered air 27. The process also includes a heating unit 32. The heating unit 32 increases the temperature of the flue gas from the regenerator 12. Electricity (or other energy) is produced in steam turbine 78 and expander 82.

Gas turbine blower 28 is a machine combination and is driven by electric motor, steam or other means. The exhaust of the gas-fired turbine provides at least some of the oxygen to the regenerator 12. Such configurations are known in the industry for use in combustion air in pressurized fluid bed combustion (PFB) plants. General descriptions of these machines are contained in "An Evaluation of Gas Turbines for AFPBC Power Plants," by D. L. Bonk and R. E. Weinstein, presented to the Powergen 2000 Conference. The fuel source for blower 28 can be provided by natural gas, waste gas, dry gas, refinery fuel gas, the byproduct C1-C3 hydrocarbons from the FCC unit itself, synthesis gas from a gasifier, liquid fuel, or other suitable fuel.

A gas turbine, also called a combustion turbine, is a rotary engine that extracts energy from a flow of combustion gas. It includes an upstream compressor coupled to a downstream turbine, and a combustion chamber in-between. Energy is generated where air or other oxygen-containing gas is mixed with fuel and ignited in the combustor. Combustion increases the temperature, velocity and volume of the gas flow. The exhaust gas flow is generally directed through a nozzle over the blades of a turbine, spinning the turbine to power the compressor and provide additional power. As with all cyclic heat engines operating on the Brayton cycle, higher combustion temperature means greater efficiency. The limiting factor is generally the ability of the steel, ceramic, or other materials that make up the engine to withstand elevated heat and pressure.

The gas turbine may be operated in a "topping" mode, where it is fed with a fuel and an oxidant which contains air and a hot oxygen-depleted gas stream. Such a stream is called "vitiated air" and may be the oxygen-depleted flue gas from the regenerator 12 or other flue gas. Another suitable hot oxygen-depleted gas stream is a flue gas from regenerator 12 in which there are significant quantities of carbon monoxide, as from a partial burn regeneration. In any of these cases, the feed stream to the gas turbine may be cleaned to a level such that particulate matter does not accumulate in the blower.

Depending on the exact configuration of gas turbine blower 28, there may be a motor-generator driver in the string. This is particularly advantageous, because the gas turbine may be turned off, allowing the air blower to supply only pressurized air to the regenerator 12. Also, if there is an abundance of hot flue gas or vitiated air, it may be advantageous to operate the gas turbine in such a way as to produce net power from the generator. The engineered machine string is preferably configured such that it can function either as a simple variable-flow air blower, or as a gas-turbine generator, depending on the desired process conditions. As a gas turbine generator, it typically operates with a large excess of air (2 to 3 times the stochiometric ratio).

Electricity (or other energy) may be produced in the gas turbine at high efficiency because of the high temperature of the gas and the fact that the heat from the combustion process is not wasted but is instead supplied to the regenerator. The feed gas stream to the regenerator 12 typically includes between 12% and 15% oxygen.

Turning now to the cogeneration process, the regenerator 12 includes a flue gas stream 70. The flue gas stream 70 typically includes as primary components $CO_2$, $N_2$, $H_2O$, and CO and has a temperature of about 700° C. (1300° F.). The flue gas stream 70 is introduced into the heating unit 32 to produce a heated flue gas stream 72. The heating unit 32 heats the flue gas to a high temperature, preferably of at least about 900° C. (1650° F.), more preferably at least about 1000° C. (1830° F.), most preferably at least about 1100° C. (2010° F.). Combustion air blower 81 provides filtered air 77 to heater 32. Fuel gas 33 is also provided to heater 32.

The flue gas 70 leaving the regenerator 12 is typically at pressures of 5 psig to 50 psig and includes levels of oxygen lower than atmospheric levels. Thus, it may be advantageous to introduce the flue gas into a heating unit 32 with so-called "premix" burners, in which the flue gas is mixed with a fuel source and pressure-boosted atmospheric air from a blower or compressor. These burners are known in the industry. Such burners have flow ratio controllers to regulate the fuel/air ratio to an optimal level for efficient combustion. The blower supplying the pressure-boosted air may be a separate machine or air can be taken from the gas-turbine blower 28. In cases where the flue gas 70 leaving the regenerator 12 contains carbon monoxide or hydrocarbons, it is most advantageous to include a monolithic block catalyst in the heating unit 32. This catalyst contains metals and promoters to encourage the remaining CO and hydrocarbons to combust to water and $CO_2$.

Turning now to the steam cycle, the saturated steam source 74 is heated with the heated flue gas 73 to produce superheated steam 76. The heating preferably occurs in heat exchange unit 86, which may be a separate unit or may be included as part of the heating unit 32. The heat exchange unit 86 may include superheating coil 85 and steam generating coil 87. The superheated steam 76 typically has a pressure of at least about 30 bar, more preferably 40-50 bar. The superheated steam 76 is introduced into a steam turbine 78 to generate electricity at high Rankine cycle efficiency. The superheated steam 76 may also be used to drive other equipment. The fluid (condensed water) 80 exiting the steam turbine 78 is recycled. Boiler feed water may also heated by flue gas stream 73 in steam generating coil 87 to provide saturated steam 75 to steam drum 83. The steam source 74 is preferably from the catalyst cooler 100 of the regenerator 12. Saturated steam 74 from the catalyst cooler 100 enters steam drum 83. Steam from the steam drum 83 enters the superheating coil 85, producing the superheated steam 76.

The steam turbine 78 may be any suitable turbine. Steam turbine 78 is typically a condensing turbine, but may also be another type of turbine such as a back pressure or extraction turbine. Condensing turbines are well known in the art as devices for converting the thermal energy of steam into mechanical energy.

The heated flue gas 72 is introduced into an expander 82 (generally a hot gas turboexpander) to recover some of the energy of the flue gas as electricity. Heated flue gas stream 73 exits the expander 82. In an alternative embodiment (not shown), expander 82 is located downstream of heat exchange unit 86. The expander 82 may be the same as conventional expander 16 from the prior art FCC process. However, since the heated flue gas 73 (or 72) may contain some particulate material, the expander 82 may be of a rugged type typically used, for example, in basic steel blast furnace top gas power recovery. Such rugged expanders may be one or more stages of expansion and coupled with electric generator set, air blower or other energy user. Such expanders are produced by MAN Turbo AG of Oberhausen, Germany, Turbomotorworks JSC of the Russian Republic and other suppliers. Further heat may be recovered from the flue gas via waste heat steam generator 18.

The catalyst cooler may include any suitable configuration. Embodiments of catalyst coolers for the regenerator are disclosed in more detail in U.S. Pat. No. 5,800,697, the contents of which are hereby incorporated by reference.

Figure 3:
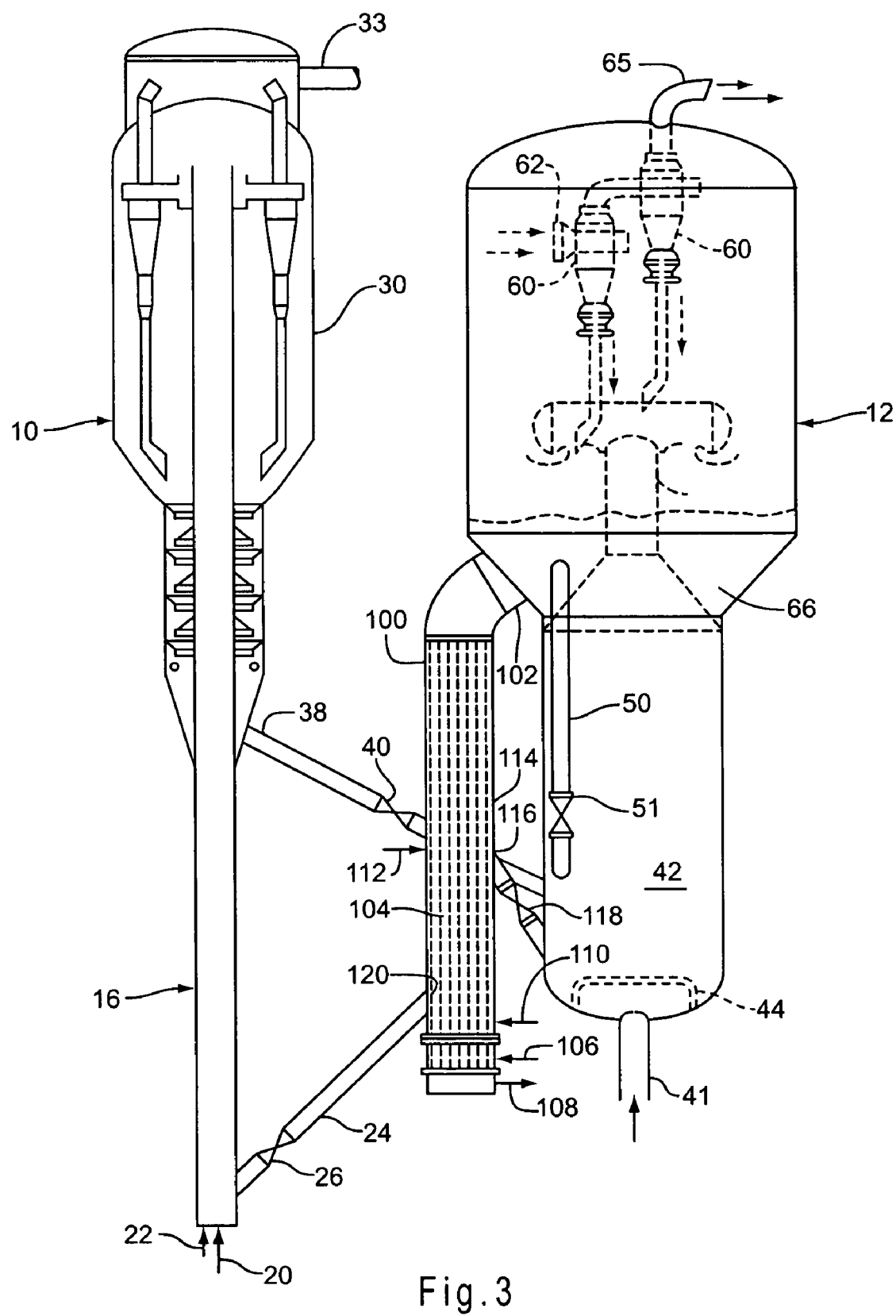
FIG. 3 shows an embodiment of a catalyst cooling system for a regenerator.

Turning now in more detail to a particular embodiment of a catalyst cooling system shown in FIG. 3, FCC feed from a conduit 20 is mixed with an additional fluidizing medium from line 22, in this case steam, and charged to the lower end of riser 17 of reactor 10. A combined stream of feed and fluidizing medium are contacted with catalyst that enters the riser through regenerated catalyst conduit 24 in an amount regulated by a control valve 26. Prior to contact with the catalyst, the feed will ordinarily have a temperature in the range of from 150° C. to 315° C. (300° F. to 600° F.).

Turning next to the regenerator side of the process, as shown in FIG. 3, regenerator 12 removes coke deposits from catalyst. Catalyst from line 38, controlled by valve 40, enters a combustion zone in the form of a lower combustor 42 of regenerator 12. Combustor 42 is a fast fluidized zone through which an oxygen containing stream transports catalyst while initiating coke combustion. The oxygen containing stream, usually air, enters combustor 42 via line 41 that supplies the oxygen-containing gas to a distributor 44 which distributes the gas over the transverse cross-section of combustor 42. Typical temperatures in the combustion zone range from 675° to 760° C. (1250° to 1400° F.). Temperatures within the combustion zone can be raised by initiating or increasing circulation of hot regenerated catalyst into the combustion zone via a recirculation conduit 50 at a rate controlled by a valve 51.

The catalyst gas and entrained catalyst pass overhead to cyclone separators 60. Cyclone arrangement 60 receives gas and catalyst through inlet 62 and directs separated flue gas 70 overhead for removal from the regenerator via line 65 for optional further processing and ultimately heat addition in heating unit 32. Such processing can include removing of ultra fine particulate material in separator 14 (see FIG. 2).

A portion of the hot regenerated catalyst from disengaging zone 66 is cooled in a catalyst cooling zone. Regenerator 12 has a catalyst cooler 100 that receives catalyst from a disengaging zone 66 through a nozzle 102. Catalyst cooler 100 operates to remove heat from the catalyst passing therethrough via contact with heat exchange tubes 104 by the circulation of a cooling fluid, such as steam, into catalyst cooler 100. Fluid stream 80 (generally condensed steam) from the steam turbine 78 enters the catalyst cooler at nozzle 106, and steam 74 exits nozzle 108 and feed the heating unit 32. Fluidizing gas may also be added to cooler 100. In this case the fluidizing gas enters at the bottom of the cooler via line 110 and at a midpoint of the cooler via line 112. An outlet 114 located at a midpoint of the cooler withdraws catalyst for transfer to combustion zone 42 via a cooler standpipe 116 at a rate regulated by a control valve 118. Towards the bottom of the cooler an outlet 120 withdraws catalyst from below outlet 114 for transfer to the reactor riser 16 via a cooler conduit 24.

Cooler 100 offers independent control of the temperature in the reaction zone and the regeneration zone. The flexibility of this cooler arrangement to provide independent control of the temperature in the reactor riser and the regeneration zone is apparent from a study of several design flow cases. The overriding control variable for the operation of the cooler in FIG. 3 is the temperature of the catalyst withdrawn through outlet 120.

The system may optionally include a heat recovery steam generator 84 at the exhaust of the gas turbine blower 28. For the same steady-state heat balance across the regenerator, the heat recovery steam generator 84 allows a smaller catalyst cooler 100, since a portion of the sensible heat is removed from the exhaust of the gas turbine, which would otherwise have been taken out by the catalyst cooler 100. The heat recovery steam generator 84 may also be used to produce superheated steam. Another advantage of the steam generator 84 is that the gas volumetric quantity of air flowing through the air distributor is lowered.

The embodiments of the processes disclosed herein improve the energy efficiency of the FCC and provide for co-generation of electric power at high cycle efficiency. Additionally, the refiner can use heavy residue in the reactor 10 in a more effective way than discharging petroleum coke to be burned in a power boiler or to be gasified. If the heavy oil has low metals content (by solvent deasphalting or other means) but contains high Conradson carbon, the residue can be effectively fed to the FCC, where the additional coke on catalyst is burned directly at high efficiency in a combined cycle, extracting electric power directly from the hot flue gas and co-generating superheated steam. The additional coke burned in the FCC regenerator scheme of this invention is recovered as electrical energy at a favorable heat rate.

The invention also provides a solution to the problem that many refineries have of being in surplus of fuel gas. It is inconvenient to treat the gas fuel and adjust the conditions of the gas to be sold outside the refinery. In the present process, the fuel gas may be used in the heating unit 32, and optionally in gas turbine, where its energy value is recovered as electricity.

The efficiency of the electricity produced in the expander 82 and condensing unit 78 is typically about 40-45%. The polytropic efficiency of the expander 82, which is the ratio of the energy extracted from the gas divided by the enthalpy change of the gas, is typically around 70%. Likewise, the efficiency of the steam turbine 78 is around 65% for typical industrial machines. Increasing the temperature of the fluid to the inlet of the expander 82 improves the amount of energy extracted. It has also been discovered that, by combining this principle with the generation of steam directly from the regenerator 12 and from the flue gas, it is surprisingly possible to execute a combined cycle in which the co-production of electricity is possible at efficiencies in excess of 40%.

According to a recent review by Ingo Paul, "Supercritical Coal-Fired Power Plants: A Technology Being Successfully Deployed in Developing Countries", Energy Issues (publisher: The World Bank), No. 19, April 1999, the current best efficiencies of the supercritical coal-fired power stations using once-through steam at 25 MPa and 562° C. is about 41%. More typically, the efficiency of operating fossil-fuel thermal power generation plants in the United States is in the 35% range. Therefore, through the present process, the FCC is able to cogenerate power at a favorable rate. The electricity is produced at high efficiency because of the high temperature of the gas and the fact that the heat from the combustion process in the FCC regenerator is not wasted but is instead supplied to a combined Brayton (turboexpander) and Rankine (condensing turbine) cycle.

The present invention may be used with any FCC process, the general conditions of which are well known in the art. The preheating process may also be used with an FCC process using a catalyst recycle reactor and/or a two stage regenerator, such as disclosed in U.S. Pat. Nos. 5,451,313 and 5,597,537, the contents of which are hereby incorporated by reference.

Global $CO_2$ emissions are reduced by the cogeneration process of the present invention, because the incremental electric power produced by the condenser 78 and expander 82 is produced from the incremental fuel at the same or higher efficiency as conventional power plants. Also, this incremental electric power is produced partly from the heat of the FCC flue gas that would otherwise be wasted or converted only to process steam at a lower efficiency.

EXAMPLES

The following examples of the invention and comparative examples are provided by way of explanation and illustration.

The following examples illustrate two modes of operation of the invention which show its utility in co-producing electric power. The results were calculated using mathematical simulations. In all examples, a catalytic cracking unit is operated on residual oil feed to produce a gasoline-oriented product. The following conditions are constant for all examples:

| | |
|---|---|
| Raw oil feed flowrate, lb/hr | 921503 |
| Catalyst/raw oil feed weight ratio | 8.16 |
| Heat of combustion of coke | 16650 |
| Heat capacity of catalyst, BTU/lb ° F. | 0.275 |
| FCC reactor temperature, ° F. | 960 |

The layout for the process of the Examples is shown in FIG. 2. In all examples, heat is partially removed from the FCC regenerator 12 by a catalyst cooler 100. This catalyst cooler 100 produces 700 psia saturated steam. The flue gas 70 leaving the regenerator 12 is sent through a catalyst separation device 14 which removes catalyst fines and other debris not removed in the regenerator's cyclones. The de-dusted flue gas 31 is sent from the catalyst separator 14 to the fired heater 32 whose heat source is a combustion burner which receives fuel gas 33 from a pressurized source mixed with air from a combustion air blower 81. In the examples, the fuel gas is natural gas having a heat of combustion of 23890 BTU/lb. The power recovery expander 82 is a single-stage machine which drives an electrical generator. The operational specifications of the expander 82 and generator are constant for all examples, as follows:

| | |
|---|---|
| Inlet pressure, psia | 55 |
| Outlet pressure, psia | 18.2 |
| Expander isentropic efficiency, % | 70 |
| Mechanical efficiency, % | 97 |

The low pressure flue gas 73 leaving the expander 82 enters a flue gas cooler 86 with a set of superheating coils 85 followed by a set of steam generating coils 87. The operational specifications for the flue gas cooler are constant for all examples, as follows:

| | |
|---|---|
| Header pressure, psia | 700 |
| Saturated steam inlet temp, ° F. | 503 |
| Flue gas outlet temp, ° F. | 700 |

Superheated steam 76 leaving the flue gas cooler's superheating section 85 is sent to a condensing steam turbine 78 which drives an electrical generator. The generator may be separate, or may be common with that of the turboexpander 82. The operational specifications for the steam turbine 78 generator are constant for all examples, as follows:

| | |
|---|---|
| Turbine inlet pressure, psia | 700 |
| Turbine outlet pressure, psia | 0.74 |
| | (surface condenser inlet) |
| Turbine insentropic efficiency | 65% |
| Mechanical efficiency | 97% |

Definitions

To quantify the power recovery system's performance in cogeneration of electricity, the following parameters are hereby defined:
  Pt=Net total power recovered, kW $$Pt = Pe + Ps - Pc$$

Where:
  Pe=power recovered by turboexpander
  Ps=power generated by condensing steam turbine
  Pc=power requirement of combustion air blower
  Hc=Cogeneration heat rate, BTU/KWh
  Hc=Qn/Pt Where:
  Qn=Net heat supplied to power recovery system=Total energy value of coke and fuel gas−Process energy requirement of FCC unit
  In this evaluation, the process energy requirement for the FCC is calculated as the heat supplied to the reactor side by the circulating catalyst.

$$Qn = (Wg \cdot Hg) + (Wk \cdot Hc) - (Wc \cdot Cp) \cdot (Trgn - Trx)$$

Wg=supplemental fuel gas rate, lb/hr
  Hg=heat of combustion of fuel gas=23890 BTU/lb
  Wk=coke rate, lb/hr
  Hc=heat of combustion of coke=16650 BTU/lb
  Wc=catalyst circulation rate, lb/hr
  Cp=average heat capacity of catalyst, 0.275 BTU/lb° F.
  Trgn=regenerator bed temperature
  Trx=reactor (riser) temperature
  The thermodynamic efficiency of power cogeneration can be calculated from the heat rate by the following formula:

$E$=thermodynamic efficiency of power cogeneration (%)=341200/($Hc$, $BTU/kwh$)

COMPARATIVE EXAMPLE

This example illustrates an FCC process with power recovery in which no additional firing of the flue gas takes place. The steam generated by the catalyst cooler 100 and flue gas cooler 86 is superheated and the steam is used to produce supplementary power in a condensing turbine.

The FCC unit regenerator operates in the mode of total coke combustion to $CO_2$. The coke composition was 6.8% hydrogen, 0.18% sulfur, and 93% carbon. The FCC regenerator parameters were a dry air rate of 14.34 lb air/lb coke and a regenerator heat removal by the catalyst cooler of 489.2 MMBTU/hr.

Referring to the process flow diagram of FIG. 2, Tables 1 and 2 show the stream properties and Table 3 shows the power balance of this example.

TABLE 1

| | \multicolumn{4}{c}{Stream number} | |
|---|---|---|---|---|---|
| | 27 | 29 | 31 | 33 | |
| Stream description | Coke burned | Air to regenerator | Catalyst circulation | Flue gas to firing | Fuel gas to firing |
| Temperature (° F.) | | 70 | 130.8 | 1301.8 | |
| Pressure (psia) | | 14.7 | | 50 | |
| Mass Flow (lb/hr) | 91321 | 1309540 | 7519460 | 1392370 | 0 |

TABLE 2

| | \multicolumn{6}{c}{Stream number} |
|---|---|---|---|---|---|---|
| | 72 | 73 | 74 | 75 | 76 | 77 |
| Stream description | Hot gas to expander | Expander exhaust | Cat cooler saturated steam | Flue gas cooler saturated steam | Superheated steam to turbine | Combustion air to firing |
| Temperature (° F.) | 1301.8 | 1042.2 | 503.2 | 503.2 | 677.4 | |
| Pressure (psia) | 50 | 18.2 | 700 | 700 | 700 | |
| Mass Flow (lb/hr) | 1392370 | 1392370 | 691046 | 92838 | 783429 | 0 |

TABLE 3

| Stream | MMBTU/hr |
|---|---|
| H1 (Heat release from coke burn) | 1429.2 |
| H2 (Heat release from fuel gas firing) | 0 |
| H3 (flue gas cooler total heat recovered) | 130.9 |
| H4 (Regenerator heat removal from catalyst cooler) | 489.2 |
| W1 (Combustion air blower) | 0 |
| W2 (Power recovered from turboexpander) | 29402 |
| W3 (Power generated from steam) | 61048 |

Example 1

Top Firing of Pressurized Flue Gas from FCC Regenerator in Complete Combustion

This example illustrates the gain of recovered power at favorable efficiency through practice of an embodiment of the process. The FCC unit regenerator operates in complete combustion to $CO_2$. The coke composition and FCC regenerator parameters are identical to the Comparative Example.

Referring to the process flow diagram of FIG. 2, Tables 4 and 5 show the stream properties and Table 6 shows the power balance of this example.

TABLE 4

| | \multicolumn{4}{c}{Stream number} |
|---|---|---|---|---|
| | 27 | 29 | 31 | 33 |
| Stream description | Coke burned | Air to regenerator | Catalyst circulation | Flue gas to firing | Fuel gas to firing |
| Temperature (° F.) | | 70 | 1301.8 | 1301.8 | 70 |
| Pressure (psia) | | 14.7 | | 50 | 70 |
| Mass Flow (lb/hr) | 91321 | 1309540 | 7527960 | 1392370 | 25485 |

TABLE 5

| | \multicolumn{6}{c}{Stream number} |
|---|---|---|---|---|---|---|
| | 72 | 73 | 74 | 75 | 76 | 77 |
| Stream description | Hot gas to expander | expander exhaust | Cat cooler saturated steam | Flue gas cooler saturated steam | Superheated steam to turbine | Combustion air to firing |
| Temperature (° F.) | 2000 | 1658 | 503 | 677 | 1078 | 70 |
| Pressure (psia) | 50 | 18 | 700 | 700 | 700 | 15 |
| Mass Flow (lb/hr) | 1905300 | 1905300 | 691046 | 335000 | 1026050 | 487450 |

TABLE 6

| Stream | MMBTU/hr |
|---|---|
| H1 (Heat release from coke burn) | 1429.2 |
| H2 (Heat release from fuel gas firing) | 608.8 |
| H3 (flue gas cooler total heat recovered) | 530.2 |
| H4 (Regenerator heat removal from catalyst cooler) | 489.2 |
| W1 (Combustion air blower) | 11304 |
| W2 (Power recovered from turboexpander) | 57632 |
| W3 (Power generated from steam) | 110934 |

Example 2

Top Firing of Pressurized Flue Gas from FCC Regenerator in Partial Combustion

This example further illustrates the gain of recovered power at favorable efficiency in an alternate embodiment of the process.

The FCC regenerator is of the type in which the coke is combusted to a mixture of CO and $CO_2$. The energy of the CO is recovered by combustion in the top firing heater. The coke composition is identical to the previous two examples. Referring to the process flow diagram of FIG. 2, Tables 7 and 8 show the stream properties and Table 9 shows the power balance of this example.

TABLE 7

| | Stream number | | | |
|---|---|---|---|---|
| | 27 | 29 | 31 | 33 |
| Stream description | Coke burned | Air to regenerator | Catalyst circulation | Flue gas to firing | Fuel gas to firing |
| Temperature (° F.) | | 70 | | 1292 | 70 |
| Pressure (psia) | | 14.7 | | 50 | 70 |
| Mass Flow (lb/hr) | 91321 | 1073020 | 7519460 | 1164340 | 12007 |

TABLE 8

| | Stream | | | | | |
|---|---|---|---|---|---|---|
| | 72 | 73 | 74 | 75 | 76 | 77 |
| Stream description | Hot gas to expander | Expander exhaust | Cat cooler saturated steam | Flue gas cooler saturated steam | Superheated steam to turbine | Combustion air to firing |
| Temperature (° F.) | 2000 | 1631 | 503 | 503 | 951 | 70 |
| Pressure (psia) | 55 | 18 | 700 | 700 | 700 | 15 |
| Mass Flow (lb/hr) | 1640020 | 1640020 | 691046 | 311034 | 1002080 | 463666 |

TABLE 9

| Stream | MMBTU/hr |
|---|---|
| H1 (Heat release from coke burn) | 1429.2 |
| H2 (Heat release from fuel gas firing) | 608.8 |
| H3 (flue gas cooler total heat recovered) | 440.4 |
| H4 (Regenerator heat removal from catalyst cooler) | 489.2 |

TABLE 9-continued

| Stream | MMBTU/hr |
|---|---|
| W1 (Combustion air blower) | 10753 |
| W2 (Power recovered from turboexpander) | 53061 |
| W3 (Power generated from steam) | 98534 |

TABLE 10

| | Comparative Example | Example 1 | Example 2 |
|---|---|---|---|
| Net power generated (kW) | 90450 | 157261 | 140842 |
| Cogeneration heat rate (BTU/kWhr) | 7987 | 8465 | 7309 |
| Efficiency, % | 42.7 | 40.3 | 46.7 |
| Add'l power recovery over Comparative Example (kW) | — | 66811 | 50392 |

Table 10 shows the net power generated, cogeneration heat rate, and efficiency (as defined in the foregoing section) for Comparative Example and Examples 1 and 2. The cogeneration heat rate is the net amount of fuel energy used to produce a kilowatt of electricity from the cycle. From Table 10, it can be seen that in Examples 1 and 2, additional electricity has been produced at heat rates of 8465 and 7309 BTU/KWh, respectively. Table 10 also shows the additional power recovery of Examples 1 and 2 over the Comparative Example. In Examples 1 and 2, 55% to 70% additional electric power is produced compared to the Comparative Example. This power is produced at efficiencies in the range of 40% to 43%. The efficiencies of the best first-generation integrated gasification combined cycle (IGCC) power plants are all at or below 45%, according to a recent reference (Higman, Christopher and Martin Van Der Burgt; "Gasification" Elsevier 2003, p. 269). This reference further explains that even the lower figures that are reached require a fair amount of integration. Since the incremental amount of electric power exported by an electric utility (the so-called "marginal load dispatch") includes the cost of fuel as well as capital, the system of the present invention by its simplicity and high efficiency allows the advantageous coproduction of power.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A cogeneration process for a regenerator in a fluidized catalytic cracking system having a reactor and a regenerator, comprising:
    introducing flue gas from the regenerator into a heating unit to produce heated flue gas at a temperature of at least about 900° C., the regenerator comprising a catalyst cooler;
    introducing the heated flue gas into an expander;
    providing steam from the catalyst cooler;
    heating the steam with the heated flue gas to produce heated steam at a pressure of at least about 30 bar; and
    introducing the heated steam into a turbine to extract energy from the steam.

2. The process of claim 1 wherein condensed water exiting the turbine is fed to the catalyst cooler.

3. The process of claim 1 wherein the heated flue gas is introduced into the expander to produce electricity after heating the steam.

4. The process of claim 3 wherein the expander is a multi-stage turboexpander.

5. The process of claim 1 wherein the heated flue gas is introduced into the expander to produce electricity before heating the steam.

6. The process of claim 1 wherein the heating unit heats the flue gas to a temperature of at least about 1000° C.

7. The process of claim 1 wherein the heating unit heats the flue gas to a temperature of at least about 1100° C.

8. The process of claim 1 wherein the steam entering the turbine is at a pressure of at least about 50 bar.

9. The process of claim 1 further comprising a gas turbine for preheating a feed gas stream to the regenerator.

10. The process of claim 1 wherein the fuel source for the heating unit comprises light hydrocarbon products from the fluidized catalytic cracking unit.

11. The process of claim 1 wherein the fuel source for the heating unit is natural gas.

12. A cogeneration system for a regenerator in a fluidized catalytic cracking system having a reactor and a regenerator, comprising:
    a heating unit in fluid communication with flue gas from the regenerator and configured to heat the flue gas to a temperature of at least about 900° C.;
    an expander in fluid communication with the heating unit for producing electricity from the heated flue gas stream;
    a steam source provided by a catalyst cooler for the regenerator;
    a heat exchanger in fluid communication with the heating unit and the steam source for heating the steam source with the heated flue gas stream; and
    a steam turbine in fluid communication with the heated steam from the heat exchanger, the steam turbine configured to generate electricity.

13. The system of claim 12 wherein the heating unit and the heat exchanger are provided in a top firing unit.

14. The process of claim 12 wherein condensed water exiting the steam turbine is used to feed the catalyst cooler.

15. The system of claim 12 wherein the heating unit is adapted to heat the flue gas to a temperature of at least about 1000° C.

16. The system of claim 12 wherein the heating unit is adapted to heat the flue gas to a temperature of at least about 1100° C.

17. The system of claim 12 wherein the fuel source for the heating unit comprises light hydrocarbon products from the fluidized catalytic cracking unit.

18. The system of claim 12 wherein the fuel source for the heating unit is natural gas.

19. The system of claim 12 wherein the heating unit comprises an oxidizing catalyst.

* * * * *